United States Patent [19]
Rivera

[11] Patent Number: 5,357,903
[45] Date of Patent: Oct. 25, 1994

[54] RETROFITTABLE SUBMERGED TERRARIUM FOR AN AQUARIUM

[76] Inventor: Christopher Rivera, 243 Koa St. #3, Wahiawa, Hi. 96786

[21] Appl. No.: 33,007

[22] Filed: Mar. 18, 1993

[51] Int. Cl.⁵ .............................................. A01K 63/00
[52] U.S. Cl. .................................................. 119/246
[58] Field of Search ............... 119/3, 5, 6.5; 47/69

[56] References Cited

U.S. PATENT DOCUMENTS

| | | | |
|---|---|---|---|
| 254,874 | 4/1980 | Totten | D30/11 |
| 301,775 | 6/1989 | McKeever | D30/104 |
| 3,542,524 | 11/1970 | Kimble et al. | 119/5 X |
| 3,893,421 | 7/1975 | Dinnerstein | 119/5 |
| 4,006,711 | 7/1975 | Frank | 119/5 |
| 4,118,889 | 10/1978 | Lamlee | 47/69 X |
| 4,204,499 | 5/1980 | Leyva et al. | 119/5 |
| 4,305,828 | 12/1981 | Heublein | 119/5 X |
| 4,787,336 | 11/1988 | Lineberry | 119/246 |
| 4,958,593 | 9/1990 | Hurlburt et al. | 119/5 |
| 5,000,118 | 3/1991 | Merritt et al. | 119/5 |
| 5,054,423 | 10/1991 | Escobal | 119/5 |
| 5,056,463 | 10/1991 | Wilkins et al. | 119/5 |

FOREIGN PATENT DOCUMENTS 3443687 5/1986 Fed. Rep. of Germany .

*Primary Examiner*—Robert P. Swiatek
*Attorney, Agent, or Firm*—Martin E. Hsia

[57] ABSTRACT

A retrofittable submerged terrarium for an aquarium comprising a bottle with a horizontal passageway tube and an upwardly extending access tube with an upper end extending above the water level. Alternatively, two bottles are attached to opposite ends of a passageway tube and an upwardly extending access tube extends above the water level that is attached either to the passageway tube or to one of the bottles. Preferably, an airway tube is provided into a bottle so that air can be circulated freely throughout the terrarium. Brackets are preferably provided to retain the apparatus near the bottom of the aquarium.

9 Claims, 3 Drawing Sheets

5,357,903

RETROFITTABLE SUBMERGED TERRARIUM FOR AN AQUARIUM

TECHNICAL FIELD

This invention relates to a retrofittable submerged terrarium for an aquarium.

BACKGROUND ART

It is known to provide a structure allowing terrestrial (air breathing) animals or plants to live underneath the water level of an aquarium containing aquatic (water breathing) animals or plants.

U.S. Pat. No. 4,958,593 to Hurlburt discloses a vivarium comprising at least one terrarium completely submerged in the water in an aquarium and optionally providing transparent passageways.

German Offenlegungsschrift 34 43 687 discloses the use of a bottle as an aquarium.

U.S. Pat. No. 4,204,499 to Leyva discloses a newt sanctuary including an airtight open topped receptacle of transparent material totally immersed in inverted position in the water of an aquarium spaced apart from the side walls of the aquarium with an air supply feed line established in an air bubble chamber in the receptacle.

U.S. Pat. No. 5,000,118 to Merritt discloses an aquatic/terrestrial display unit providing an illusion of superimposition of aquatic and terrestrial environments employing lensing effects.

U.S. Pat. Nos. Des. 301,775 to McKeever and Des. 254,874 to Totten disclose ornamental designs for combined aquariums and terrariums.

U.S. Pat. No. 5,056,463 to Wilkins discloses an aquarium-terrarium apparatus including an inverted dome overlying a base member with the dome in operative communication with food and air supply and including a plant support stand.

U.S. Pat. No. 4,787,336 to Lineberry discloses a controlled environment habitat for aquariums comprising a transparent housing submerged in an aquarium having a forced air pump.

A problem with submerged terrariums is that, in order to house animal life, food must be provided to the terrarium at regular intervals. The apparatus of Hurlburt provides access from the bottom but requires modification to the structure of the aquarium. The apparatus of Lineberry requires that the terrarium house insects that feed on the plants in the terrarium, or that the terrarium units be removed from the aquarium for feeding.

The combined terrarium and aquarium systems described above all require the use of aquariums that are structurally modified to house an underwater terrarium or do not provide adequate access to the terrarium for feeding animal life.

Recently, soft drinks and other products have been distributed and sold in transparent plastic bottles, usually containing approximately one liter. However, these plastic bottles cannot be recycled as easily as glass bottles and do not readily break down in the environment so that they pose a substantial disposal problem.

Accordingly, it is an object of this invention to provide a submerged terrarium that can be retrofitted in existing aquariums.

It is a still further object of this invention to provide such a terrarium that provides adequate access to the terrarium for the maintenance of terrestrial organisms in the terrarium.

It is a still further object of this invention to provide such an apparatus that employs plastic bottles that otherwise would not be recycled.

It is a still further object of this invention to provide such an apparatus that has improved air flow characteristics for providing fresh air to the terrestrial organisms in the submerged terrarium.

It is a still further object of this invention to provide such a terrarium that extends horizontally along a substantial portion of the bottom of an aquarium in order to provide an extended terrestrial environment.

DISCLOSURE OF INVENTION

These and other objects are achieved by a waterproof container having an interior placed in an aquarium below the water level, with an upwardly extending access tube waterproofly attached to the container with an end extending above the water level. By "waterproofly attached" is meant that the parts are attached in a waterproof manner. Preferably, the container comprises a bottle, more preferably a used plastic bottle. Preferably, a passageway tube having a bottle end and an access tube end is waterproofly attached at the bottle end to the bottom of the bottle, and the container end of the access tube is attached to the access tube end of the passageway tube. Air supply means communicating with the interior of the container for supplying air for the terrarium is preferably provided. This air supply means preferably comprises an airway tube communicating with the interior of the bottle waterproofly attached to the side of the bottle and connected to an air supply tube connected to the aquarium's existing air supply. Optionally, air permeable closing means on the air end of the access tube can be provided to prevent escape of the animals in the terrarium. Preferably retaining means are provided to retain the terrarium approximately three fourths of the way towards the bottom of the aquarium. Such retaining means preferably comprise mounting brackets.

An second embodiment is preferred for larger aquariums in which two bottles are waterproofly attached to opposite ends of a passageway tube, an upwardly extending access tube extends above the water level from one of the bottles and an airway tube is waterproofly attached to the other bottle.

In a third embodiment, the access tube can extend upwardly from the passageway tube between the two bottles instead of from one of the bottles.

In a fourth embodiment, an upwardly extending access tube is attached directly to a single bottle.

Because of the particular configuration of the airway tube communicating with the interior of the terrarium and the access tube communicating with the air above the aquarium, air flows into the interior of the terrarium through the airway tube, circulates freely throughout the terrarium (which includes one or two bottles, an optional passageway tube, and the access tube) and flows out of the interior through the air end of the access tube. Further, the access tube allows feeding of terrestrial animals placed in the terrarium and other access to the terrarium environment for other purposes, such as providing water.

Because the present invention uses already available plastic bottles, it is anticipated that the invention can be conveniently practiced using a kit that converts such bottles into submerged terrariums. The user could create such terrariums by providing the bottle with an air supply, placing terrestrial living organisms in the bottle, and submerging the bottle and organisms in an aquarium. Preferably, the user also would attach an upwardly extending access tube to the bottle communicating with its interior and extending above the aquarium's water level. The kit would include an airway tube comprising transparent plastic, an access tube comprising transparent plastic, and a nontoxic waterproof elastic adhesive adapted for waterproofly adhering the access tube and the airway tube to the bottle. The process of conversion would comprise waterproofly attaching to the bottle an upwardly extending access tube having an air end extending above the water level and submerging the bottle in the aquarium, preferably also providing air supply means to the interior of the bottle.

Other objects, features and advantages of the present invention will become more fully apparent from the following detailed description of the preferred embodiments for carrying out the inventions, the claims and the accompanying drawings.

DETAILED DESCRIPTION OF PREFERRED EMBODIMENTS

Figure 1:
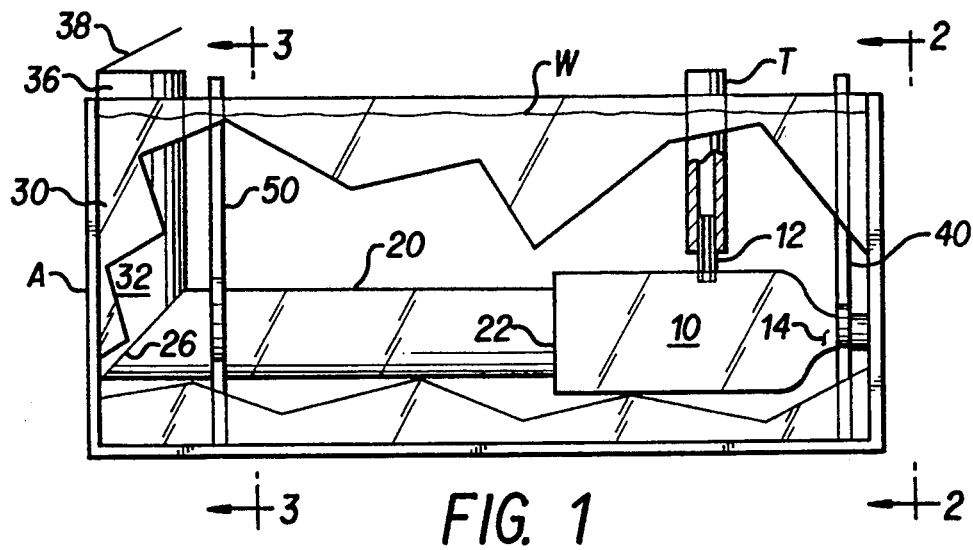
FIG. 1 is a front elevational view of a first preferred embodiment of the present invention.

Referring to FIG. 1, shown is a front elevational view of a first preferred embodiment of the present invention. A bottle 10 having an axis is placed with its axis approximately parallel to the water level W of an aquarium A, preferably so that the bottle is approximately three-fourths of the way towards the bottom. Preferably the bottle 10 is a used plastic bottle, more preferably having a capacity of one liter, and is preferably at least partially transparent, optimally comprising transparent plastic. Preferably an airway tube aperture (not shown) has been formed in the side of the bottle 10, and a passageway tube aperture (not shown) has been formed in the bottom of the bottle 10.

The bottle 10 is preferably provided with an air supply means communicating with the interior of the bottle for providing an air supply to the interior of the bottle 10. Preferably, this air supply means comprises an airway tube 12 that is waterproofly attached to the side of the bottle 10 through the airway tube aperture, so that the airway tube 12 communicates with the interior of the bottle 10. Preferably an air supply tube T connected to the existing air supply for the aquarium A is connected over the airway tube 12, thus supplying air to the interior of the bottle 10. Preferably the airway tube 12 is configured to mate with standard aquarium air supply tubes having an outside diameter of, for example, ¼ inch or approximately 7 mm. Of course, the airway tube 12 also can be configured to mate with other sizes of aquarium air supply tubes, either directly or with an adapter.

Preferably a passageway tube 20 having a bottle end 22 and an access tube end 26 is waterproofly attached at the bottle end 22 over the passageway tube aperture, so that the passageway tube 20 is in communication with the interior of the bottle 10. More preferably, the passageway tube 20 is at least partially transparent, optimally comprising transparent plastic, and has an outside diameter slightly less than the diameter of the bottle 10, preferably approximately 4 inches. The passageway tube 20 preferably extends horizontally until the access tube end 26 is adjacent to the side of the aquarium A so that the bottle 10 and passageway tube 20 extend across most of the width of the aquarium A.

Preferably the access tube end 26 of the passageway tube 20 is waterproofly attached to an upwardly extending access tube 30 having a passageway tube end 32 and an air end 36, the air end 36 extending above the water level W. Preferably the access tube 30 is at least partially transparent and optimally comprises transparent plastic having a diameter of approximately one inch.

The bottle 10 and the passageway tube 20 accordingly provide an extended terrestrial environment under the water level W of the aquarium A. The terrestrial environment is continuously provided with fresh air because air flows from the air supply tube T into the airway tube 12, flows through the interior of the bottle 10, the interior of the passageway tube 20 and the interior of the access tube 30, and flows out through the air end 36. The terrestrial environment also can be provided with food or other materials by introducing them through the access tube 30.

Obviously all parts of the apparatus must be waterproofly attached to each other. It is preferred that the adhesive used in attaching these parts of the apparatus be an adhesive that is non-toxic after drying, will not dissolve or degrade during long exposure in water, that will remain flexible to resist cracking from mechanical stress (during placement in the aquarium, for example) and yet provide a strong bond that remains waterproof over extended periods of time. It is accordingly preferred that the adhesive be a cyanoacrylate, preferably sold under the trademark "Krazy Glue." The inventors have found from their experiments that this adhesive will allow the apparatus to remain waterproof for more than a year.

Figure 2:
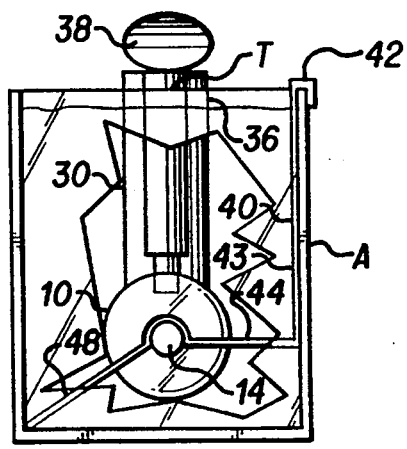
FIG. 2 is a side elevational view of the embodiment of FIG. 1 along the line 2—2.
Figure 3:
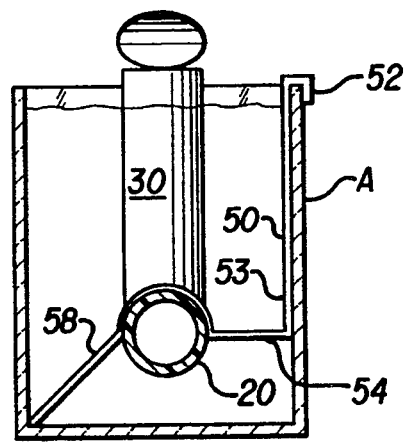
FIG. 3 is a side elevational view of the embodiment of FIG. 1 along the line 3—3.

Because the bottle 10, passageway tube 20 and upwardly extending access tube 30 will be filled with air, they will be buoyant and rise to the water level W of the aquarium A unless retained in place near the bottom of the aquarium A. Accordingly, retaining means is preferably provided to retain the terrarium below the water level W. The inventors prefer that the retaining means comprise retaining brackets, such as a neck bracket 40 and a passageway tube bracket 50 that hold down the neck of the bottle 14 and the passageway tube 30 of the apparatus, respectively. Referring to FIG. 2, shown is a side view of the neck bracket 40 which has a hook 42 at the top to be hooked over the rear of the aquarium A. The bracket 40 then has a downwardly extending shank 43 that preferably abuts against the side of the aquarium A. A horizontally extending leg 44 extends from the shank 43 and then partially encircles the neck 14 of the bottle 10. Finally, an anchor portion 48 preferably extends from the neck 14 outwardly towards a corner of the aquarium A. Referring to FIG. 3, shown is the passageway tube bracket 50, which is also provided with a hook 52 at its upper end and a vertical shank 53 parallel to and abutting against the rear of the aquarium A. A passageway leg 54 extends horizontally towards and partially encircles the passageway tube 20 and an anchor portion 58 extends into a corner of the aquarium A.

Figure 4:
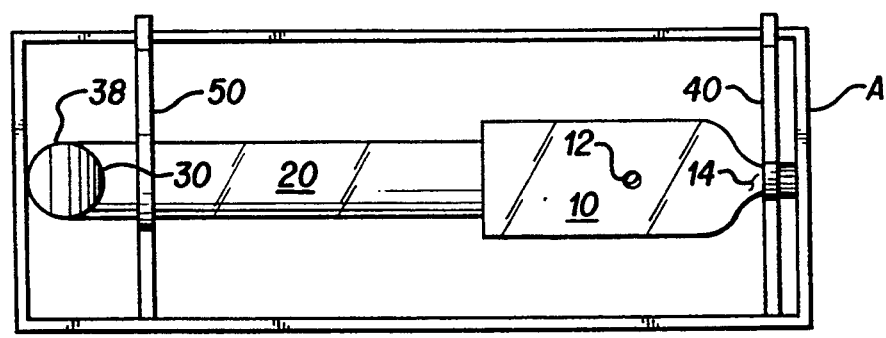
FIG. 4 is a top plan view of the embodiment of FIG. 1.

Referring to FIG. 4, shown is a top plan view of the embodiment of FIG. 1 showing the neck bracket 40 and the passageway bracket 50 extending from the rear of the aquarium A to the neck of the bottle 14 and the passageway tube 30, respectively, and then diverging outwardly to the corners of the aquarium A. It is preferred that the neck bracket 40 and the passageway tube bracket 50 comprise 16 gauge flat stainless steel strapping wire.

Figure 5:
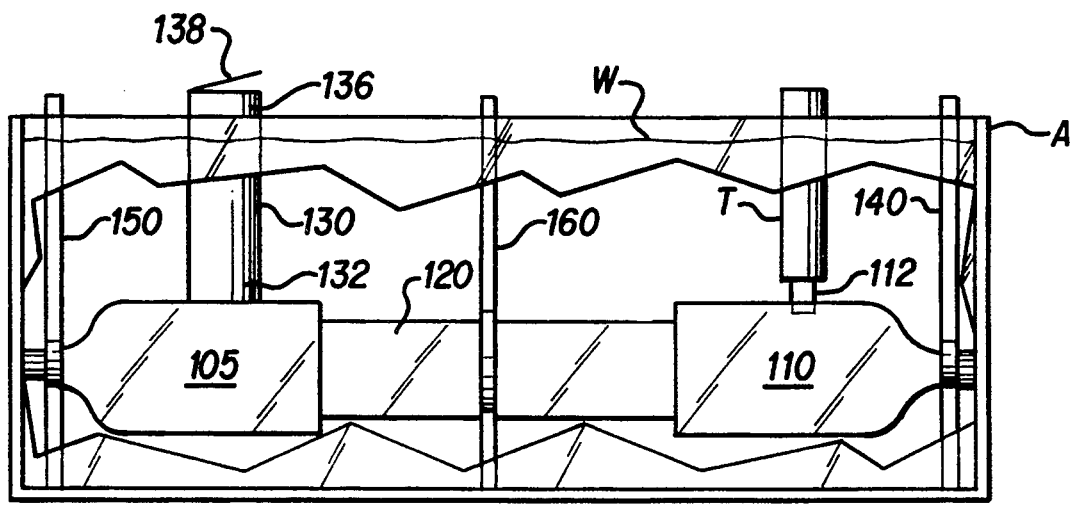
FIG. 5 is a front elevational view of a second preferred embodiment of the present invention.

Referring to FIG. 5, shown is a front elevational view of a second preferred embodiment of the present invention. This embodiment is identical to the first embodiment, except as described below. In this embodiment, a first bottle 105, and a second bottle 110 are waterproofly attached to opposite ends of a passageway tube 120. An upwardly extending access tube 130 having a bottle end 132 and an air end 136 is preferably waterproofly attached at the bottle end 132 to the first bottle 105, with the air end 136 above the water level w of an aquarium A. An airway tube 112 is preferably waterproofly attached to the side of the second bottle 110, communicating with the interior of the second bottle 110. An air supply tube T connected to the existing air supply for the aquarium A is then connected to the airway tube 112.

In order to retain this embodiment near the bottom of the aquarium A, side brackets 140 and 150 and a center bracket 160 are provided. The side bracket 140 for the second bottle 110 is identical to the neck bracket 40 for the first embodiment described above, and the other side bracket 150 is a mirror image of side bracket 140. Center bracket 160 preferably has the same configuration as the passageway bracket 50 for the embodiment of FIG. 1, except that it is in a single plane parallel to the sides of the aquarium A.

Figure 6:
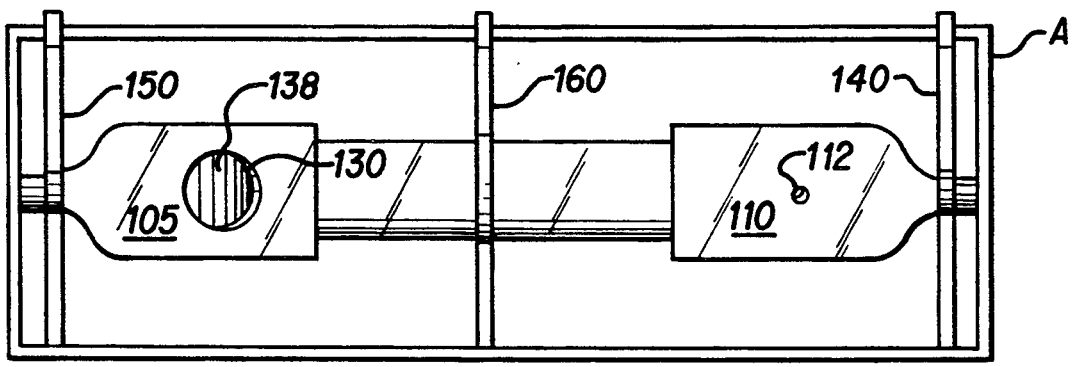
FIG. 6 is a top plan view of the embodiment of FIG. 5.

Referring to FIG. 6, shown is a top plan view of the embodiment of FIG. 5, showing the side brackets 140 and 150 extending from the rear of the aquarium A to the necks of the bottles 105 and 110 and then diverging outwardly to the corners of the aquarium A.

Preferably the air end 136 of the access tube 130 is provided with air permeable closing means for closing the air end removably mounted on the air end. This closing means allows air to permeate through the air end, yet is removable to allow water and other material to be introduced into the interior of the apparatus. This would prevent escape of any animals that might be placed in the terrarium comprising bottles 105 and 110, the passageway tube 120, and the access tube 130. Preferably the air permeable closing means comprises a door 138 having air permeable portions hingedly mounted on the air end. A similar door 38 can be provided for the embodiment of FIG. 1.

Figure 7:
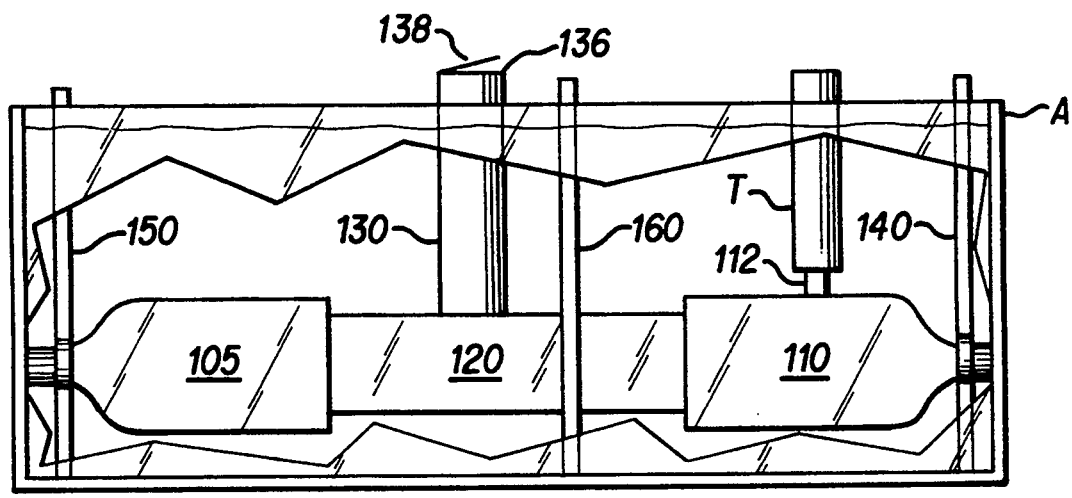
FIG. 7 is a front elevational view of a third preferred embodiment of the present invention.

Referring to FIG. 7, shown is a front elevational view of a third preferred embodiment of the present invention identical to the embodiment of FIGS. 5 and 6 except with the upwardly extending access tube 130 waterproofly attached to the passageway tube 120 instead of the first bottle 105.

Figure 8:
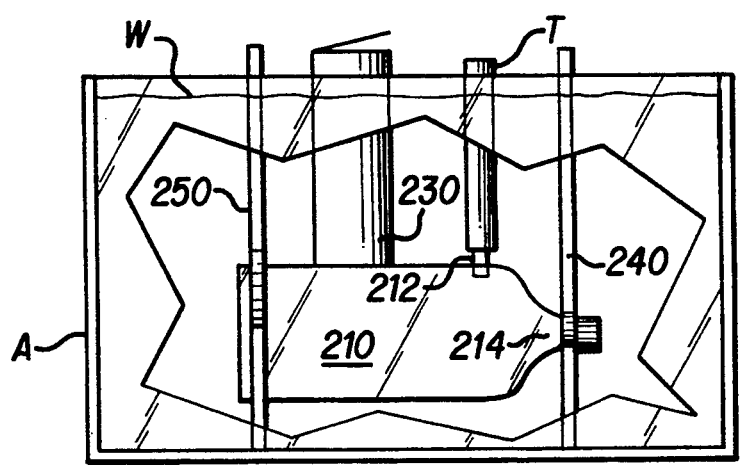
FIG. 8 is a front elevational view of a fourth preferred embodiment of the present invention.

Referring to FIG. 8, shown is a front elevational view of a fourth preferred embodiment of the present invention identical to the first embodiment described above, but without a passageway tube. In this embodiment, an access tube aperture (not shown) and an airway tube aperture are formed in the side of a bottle 210. An airway tube 212 is waterproofly attached to the bottle 210 through the airway tube aperture, and an upwardly extending access tube 230 is waterproofly attached over the access tube aperture. A neck mounting bracket 240 similar to the neck mounting bracket 40 of the first embodiment retains the neck 214 of the bottle 210 below the water level W, while a bottom mounting bracket 250 retains the bottom of the bottle 210 below the water level W. The bottom mounting bracket is similar to the passageway tube bracket 50 of the first embodiment, except that it is configured to encircle the Larger diameter of the bottom of the bottle, instead of the smaller diameter of the passageway tube 20.

While the invention has been described above with respect to particular preferred embodiments, it will be appreciated by those skilled in the art that changes and modifications can be made without departing from the spirit and scope of the invention. Accordingly, no limitations are to be inferred or implied except as specifically set forth in the attached claims.

INDUSTRIAL APPLICABILITY

This invention can be used to provide all existing aquariums with a submerged terrarium without any major structural modifications to the aquarium itself.

What is claimed is:

1. A retrofittable submerged terrarium for an aquarium having a water level, comprising:
   a waterproof container having an interior placed in said aquarium below said water level;
   an upwardly extending access tube attached to said container communicating with said interior and extending above said water level;
   air supply means for supplying air to said interior communicating with said interior;
   wherein said container comprises a bottle having an interior, an axis, a side and a bottom;
   wherein said bottom of said bottle has a passageway tube aperture and said side of said bottle has an airway tube aperture;
   further comprising:
   a passageway tube having a bottle end and an access tube end waterproofly attached at said bottle end over said passageway tube aperture and communicating with said interior;
   wherein said upwardly extending access tube has a passageway tube end and an air end, said passageway tube end being waterproofly attached to and communicating with said access tube end of said passageway tube and said air end extending above said water level; and
   wherein said air supply means comprises an airway tube waterproofly attached to said airway aperture and communicating with said interior.

2. A terrarium according to claim 1, wherein said bottle is mounted in said aquarium so that said axis is approximately parallel to said water level.

3. A terrarium according to claim 2, wherein said bottle is at least partially transparent.

4. A retrofittable submerged terrarium for an aquarium having a water level, comprising:
   a first bottle having an interior, an axis, a side and a bottom, said bottom having a first bottle passageway tube aperture and said side having an airway tube aperture;

a second bottle having an interior, an axis, a side and a bottom, said bottom having a second bottle passageway tube aperture and said side having an access tube aperture;

a passageway tube having a first end and a second end, said first end being waterproofly attached to said first bottle passageway tube aperture and communicating with said interior of said first bottle and said second end being waterproofly attached to said second bottle passageway tube aperture and communicating with said interior of said second bottle;

an airway tube waterproofly attached to said airway tube aperture and communicating with said interior of said first bottle; and an upwardly extending access tube having a bottle end and an air end, said bottle end waterproofly attached to and communicating with said access tube aperture in said side of said second bottle and said air end extending above said water level.

5. A retrofittable submerged terrarium for an aquarium having a water level, comprising:

a first bottle having an interior, an axis, a side and a bottom, said bottom having a first bottle passageway tube aperture and said side having an airway tube aperture;

a second bottle having an interior, an axis, a side and a bottom, said bottom having a second bottle passageway tube aperture;

a passageway tube having a first end, a second end and an access tube aperture, said first end being waterproofly attached to said first bottle passageway tube aperture and communicating with said interior of said first bottle and said second end being waterproofly attached to said second bottle passageway tube aperture and communicating with said interior of said second bottle;

an airway tube waterproofly attached to said airway tube aperture and communicating with said interior of said first bottle; and an upwardly extending access tube having a passageway tube end and an air end, said passageway tube end waterproofly attached to and communicating with said access tube aperture in said passageway tube and said air end extending above said water level.

6. A terrarium according to any one of claims 1, 4 and 5, wherein said passageway tube is at least partially transparent.

7. A terrarium according to claim 6, wherein said access tube is at least partially transparent.

8. A terrarium according to claim 7, further comprising:

air permeable closing means for closing said air end removably mounted on said air end.

9. A process for using a bottle having an interior, comprising:

providing said bottle with an air supply inlet;

placing terrestrial living organisms in said bottle;

submerging said bottle and said organisms in an aquarium; and waterproofly attaching an upwardly extending access tube, separately from said air supply inlet to said bottle communicating with said interior and extending above said water level.

* * * * *